July 3, 1962
I. M. LIELL
3,042,002
MULTIPLE CALF FEEDER
Filed Aug. 10, 1959
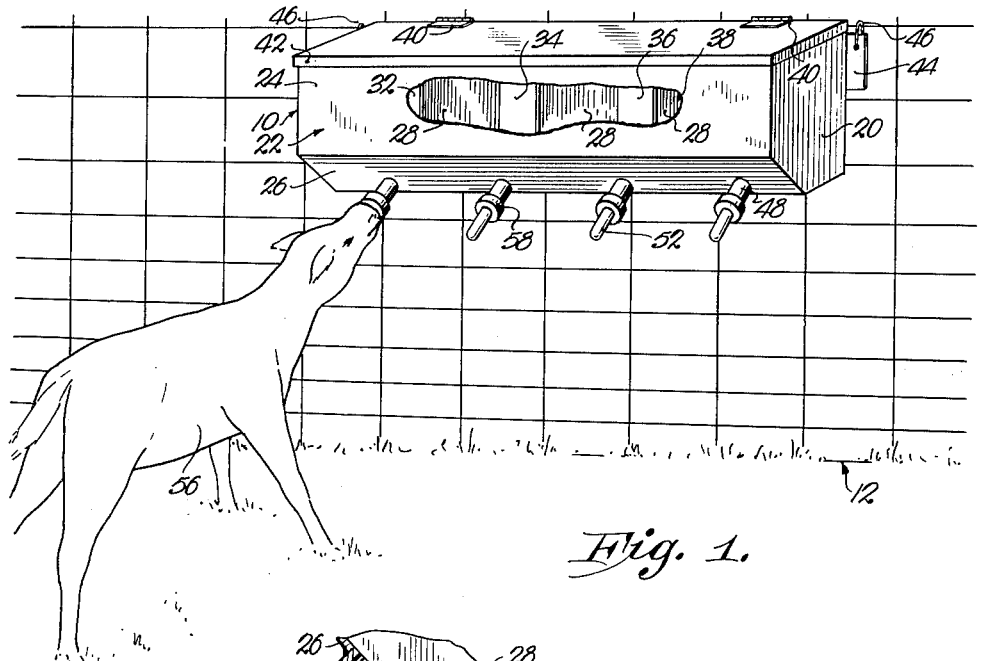
Fig. 1.
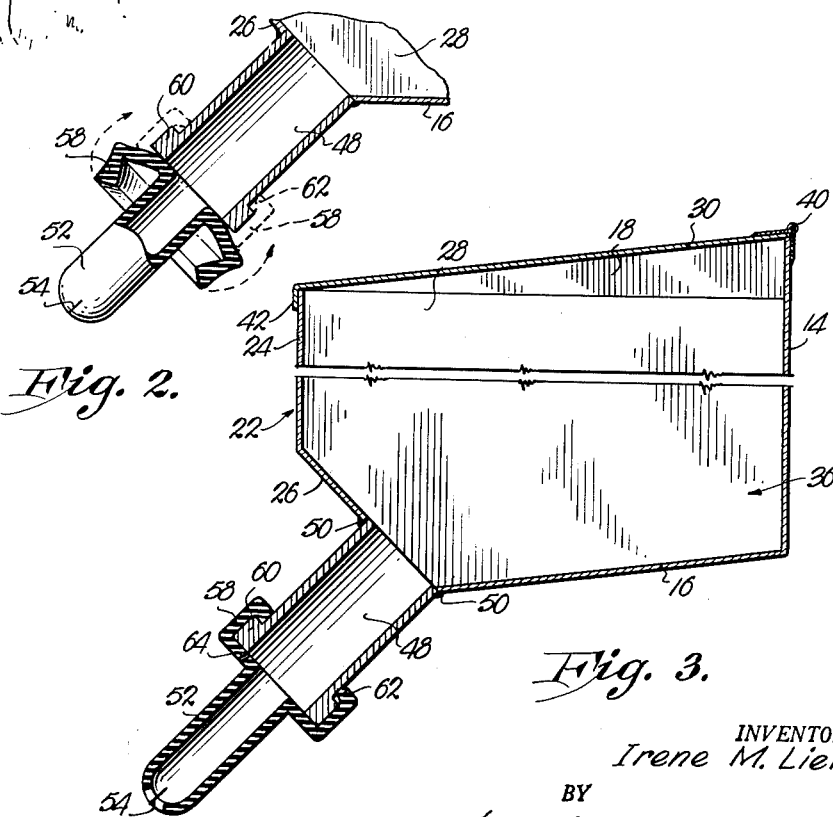
Fig. 2.
Fig. 3.
INVENTOR.
Irene M. Liell
BY
Hovey, Schmidt, Johnson & Hovey
ATTORNEYS.

United States Patent Office 3,042,002
Patented July 3, 1962

3,042,002
MULTIPLE CALF FEEDER
Irene M. Liell, Rte. 1, Blue Springs, Mo.
Filed Aug. 10, 1959, Ser. No. 832,709
1 Claim. (Cl. 119—71)

This invention relates to the feeding of livestock, and more particularly calves, the primary object being to eliminate the tedious, difficult and time-consuming task of feeding each calf individually from a bucket, particularly during the milk drinking stages of its life and continuing through the stages of supplementing his diet with prepared liquids that include dietary substances admixed with milk and/or water.

It is common knowledge that when a calf is to be taken away from its mother for hand feeding, it becomes necessary to teach the calf to drink from a bucket. Initially, one must hold the calf's head in the bucket with his mouth immersed in the milk with one hand and permit the calf to suckle a finger of the other hand, all the while attempting to hold the bucket. During such period of learning, and even after the calf has learned to drink from the bucket, he continually fights and rams the bucket, presenting a difficult operation especially after the calf has grown to a point where he has considerable strength. In addition to the foregoing, the feeding of a large number of calves in such manner at least twice each day, is quite time-consuming.

It is the most important object of the present invention therefore, to provide a calf feeder that permits the calf to suckle a nipple in order to obtain his ration of liquid.

Another important object of the present invention is to provide a calf feeder that may be placed in use by merely pouring the milk into a well of a tank whereupon no further attention upon the part of the owner is required.

Still another object of the instant invention is the provision of a multiple calf feeder made in a manner to permit simultaneous feeding of a large number of calves without operator attention.

It is still another object of the present invention to provide a multiple calf feeder that may be mounted in a convenient and proper position for access by the calves; that may be quickly and easily cleaned after each use; and to provide a calf feeder that is rigid, easily manufactured and of simple construction.

In the drawing:

FIG. 1 is a front elevational view of a multiple calf feeder made pursuant to my present invention showing the manner of use thereof, parts being broken away for clearness.

FIG. 2 is an enlarged, fragmentary, detailed, cross-sectional view illustrating one of the outlet tubes and the nipple therefor; and FIG. 3 is an enlarged, vertical, transverse, cross-sectional view through the feeder.

A tank, broadly designated by the numeral 10, is shown mounted in an elevated position in FIG. 1, as for example, on a fence 12. Open top tank 10 may be made entirely from sheet metal or other material and is provided with a rectangular back wall 14, a rectangular bottom wall 16, a pair of upright ends 18 and 20, a front wall 22 having a pair of rectangular panels 24 and 26, a plurality of partitions 28, and a rectangular lid 30 covering the open top of the tank 10.

The longitudinal axes of the back wall 14 and the bottom wall 16, as well as the panels 24 and 26, are horizontal, and the transverse axes of the back wall 14, as well as the panel 24, are vertical when the tank 10 is mounted on the fence 12 in the manner illustrated in FIG. 1. However, the transverse axis of the bottom wall 16 slopes upwardly as the back wall 14 is approached, as shown in FIG. 3. The panel 26 interconnects the bottom wall 16 and the panel 24 and has its transverse axis inclined downwardly as the bottom wall 16 is approached.

The series of spaced-apart, parallel partitions 28 within the tank 10, join the walls 14, 16 and 22 thereby subdividing the tank 10 into a number of wells 32, 34, 36 and 38, it being noted in FIG. 3 that the upper edges of the partitions 28 are horizontal within the plane of the upper edge of panel 24.

The lid 30 rests upon the upper edges of the back wall 14, the ends 18 and 20 and panel 24. The longitudinal axis of lid 30 is horizontal but it slopes downwardly transversely thereof as the panel 24 is approached. A plurality of hinges 40 mount the lid 30 on the back wall 14 for vertical swinging movement to and from the closed position illustrated in FIGS. 1 and 3. A downturned flange 42 integral with the lid 30 overlaps the outer and upper margins of the ends 18 and 20 and the panel 24 when the lid 30 is closed.

The outturned wings 44 on the back wall 14 are adapted to receive hooks or the like 46, so that the entire feeder may be attached to the fence 12 or mounted on any other suitable vertical support such as a wall, it being understood that the means for mounting may be varied substantially as conditions require.

An elongated tube 48 registers with each well 32, 34, 36 and 38 respectively, through the panel 26, to which the tubes 48 are secured as by welding 50. Each elongated tube 48 has its longitudinal axis inclined downwardly and outwardly from the outer face of the panel 26 by virtue of the fact that such axes are perpendicular to the panel 26 adjacent the line of merger between panel 26 and bottom wall 16.

A nipple 52 is attached to the outermost and lowermost terminal end of each tube 48 respectively. Nipples 52 may be made from rubber or other flexible material and a pair of crossing slits 54 present an outlet orifice only when the nipples 52 are collapsed by the pulsating suckling action on the part of calf 56.

The uppermost end of each nipple 52 has a bell portion 58 that surrounds and is hooked over continuous outturned flange 60 integral with tube 48 at its outermost free end.

FIG. 2 of the drawing illustrates the manner of applying the nipple 52 to the tube 48 wherein bell portion 58 is first turned inside out and then permitted to snap into place upon the flange 60 where hook portion 62 of the bell 58 is in overlapping relationship to the upper edge of flange 60 and in surrounding relationship to the tube 48. An air vent 64 in bell portion 58 communicates with the tube 48.

It is now quite evident that the operator need merely raise the lid 30 in order to pour a pre-selected quantity of milk or other liquid into wells 32, 34, 36 and 38. Thereupon, the calves 56 will immediately feed themselves by suckling the nipples 52. The feeder requires no further attention and the calves may be permitted to suckle the nipples 52 as long as they may desire and no damage can come to the feeder regardless of the amount of ramming that is imparted thereto by the calves as the result of the inherent instinctive tendency to attempt to obtain more food or try to increase its rate of flow.

Thereupon, the feeder may be quickly and easily cleaned by removal of the nipples 52 for washing, and the tank 10 itself may be rinsed through use of a water hose or other means.

Having thus described the invention what is claimed as new and desired to be secured by Letters Patent is:

A calf feeder comprising an open top tank having a rectangular back wall, a rectangular bottom wall, a pair of upright ends, and a front wall having a pair of rectangular panels, the longitudinal axes of the back and bottom walls and said panels being horizontal, the transverse axes of the back and one of the panels being vertical, the transverse axis of the bottom wall sloping upwardly as the back wall is approached, the other panel joining the bottom wall and said one panel and having its transverse axis inclined downwardly as the bottom wall is approached, the upper edge of said back wall being spaced above the upper edge of said one panel; a rectangular lid covering the open top of said tank and resting on the upper edges of said back wall, said ends and said one panel; hinge means mounting one margin of said lid on the upper edge of said back wall, said lid having a flange thereon at the margins thereof adjacent and opposed to said one margin, said flange depending from said adjacent and opposed margins along said ends and said one panel proximal to the upper edges thereof when said lid rests upon the latter; a plurality of partitions in the tank parallel with said ends and joining said walls, sub-dividing the tank into a number of wells; an elongated tube registering with each well respectively through said other panel and secured to the latter in perpendicular relationship thereto with the longitudinal axes of the tubes inclined downwardly and outwardly from the outer face of the other panel; and a nipple for attachment to the outermost and lowermost terminal end of each tube respectively, each tube having an annular outturned flange adjacent its said terminal end, each nipple having a bell portion provided with an annular groove therein on the inner surface thereof for complementally receiving the flange of the corresponding tube, said bell portion having a flexible element thereon interconnecting the bell portion with the nipple and disposed for permitting the bell portion to be shifted in one direction until said nipple is aligned with the corresponding tube and to be shifted into the opposite direction to snap onto the tube with the flange of the latter seated within the groove of the bell portion.

References Cited in the file of this patent
UNITED STATES PATENTS

| | | |
|---|---|---|
| 1,358,510 | Ward | July 26, 1921 |
| 1,630,982 | Stone | May 31, 1927 |
| 2,710,593 | Lippi | June 14, 1955 |